3,096,178
CHEMICALLY LEAVENED YEAST DOUGH

James W. Tucker, Park Forest, Ill., assignor to Stauffer Chemical Company, New York, N.Y., a corporation of Delaware
No Drawing. Filed May 2, 1961, Ser. No. 107,052
2 Claims. (Cl. 99—94)

The present invention is directed to improved yeast dough compositions, their method of preparation, and leavened yeast rolls resulting therefrom. In particular, it is directed to fast-leavening frozen yeast doughs produced by the inclusion of chemical leavening agents in a standard yeast dough formulation.

Frozen, unbaked roll or biscuit doughs containing yeast leavening agents have been made available commercially in recent years. The consumer is thereby provided with a means for preparing hot, freshly-baked yeast rolls in the home without having the task of compounding the dough. Although yeast rolls are very desirable, if not preferable, owing to the pleasant taste imparted by the flavor of the yeast constituent, full realization of the commercial potential of frozen yeast doughs has been somewhat handicapped by the time-consuming requirements necessary in the final steps of preparation accomplished by the consumer.

Preparation of yeast rolls from frozen doughs requires both proofing (leavening) and baking by the consumer. Proofing involves removing the frozen dough from its cold storage (household freezer, etc.) and placing it at room or mildly elevated oven temperatures, i.e., 70° F. to about 150° F., for approximately two to three hours, until sufficient leavening gas is generated, by the action of the yeast enzymes upon the flour carbohydrates, to "raise" the dough to a suitable degree. To bake the raised dough, it is simply placed in a 300° F. to 500° F. oven for about 10 minutes, or until an even, golden brown crust develops. Obviously, the prolonged proofing time is a serious disadvantage.

I have now discovered that chemical leavening agents may be added to yeast doughs before freezing to decrease the proofing time to 20 to 30 minutes. By my method, bicarbonate of soda and a sodium aluminum phosphate are thoroughly mixed together with the usual amount of yeast or, in the alternative, a yeast flavoring agent, into a batter or dough comprising a standard yeast dough formulation. The resulting chemically leavened frozen yeast product retains the desirable yeast flavor, although little or no leavening action is contributed by the yeast or yeast flavoring agent during the shortened proofing period. While the supplemental leavening system materially shortens proofing time, no palpable differences in overall taste, crumb, color, and grain can be distinguished from the yeast-leavened products of the prior art. There is a difference, however, in the specific volume of chemically leavened yeast rolls. The chemically leavened rolls are less dense (fluffier), and therefore more desirable, than those made from yeast roll formulations available heretofore.

My discovery is especially surprising in view of the unsuitability of other popular chemical leavening systems for the same purpose. For example, the various calcium phosphate-bicarbonate of soda leavening systems demonstrate prohibitive "bench action" and/or tend to liberate gas while contained in the stored frozen doughs. These difficulties result in poor proofing sensitivity, etc., when the dough is thawed. Yeast rolls prepared with a sodium acid pyrophosphate-bicarbonate of soda leavening system have a very pronounced "pyro" flavor, undoubtedly accentuated by the yeast. Even potassium aluminum phosphate and ammonium aluminum phosphate baking acids have been found to produce unsuitable yeast rolls.

It may, in fact, be stated broadly that all of the popular phosphate baking acids, with the exception of sodium aluminum phosphate, when added to yeast roll formulations together with bicarbonate of soda, yield poor results for one or more of the reasons that they produce undesirable (1) bench action, (2) proofing sensitivity, (3) specific volume, or (4) taste.

The chemical leavening systems of the present invention consist of bicarbonate of soda, as the gassing agent, and a sodium aluminum phosphate (hereinafter alternatively denoted SAP), as the baking acid. The SAP which may be used is a complex, acidic soluble compound which may be represented generally by the formula $$NaAl_{3-4}H_{11-17}(PO_4)_{7-10} \cdot 0-8H_2O$$

This compound may be either in a crystalline or amorphous form.

One particularly preferred form found suitable for use in the present invention is the crystalline compound of the formula $NaAl_3H_{14}(PO_4)_8 \cdot 4H_2O$, which is disclosed in U.S. Patent 2,550,490. Of the SAP modifications tried, this compound furnished the most desirable combination of taste, specific volume, and proofing sensitivity.

Nevertheless, the other SAP modifications may also be used since they do not impart off-taste or tend to cause gassing while contained in the frozen dough. In this respect, the dehydrated modifications containing from zero to four moles of hydrate water have been found useful. These compounds are disclosed in U.S. Patent 2,957,750. An amorphous form of SAP having the empirical formula $NaAl_3H_{11}(PO_4)_7 \cdot 5-8H_2O$ has also been found satisfactory. This product gives a blank powder X-ray diffraction pattern which indicates its amorphous form. Since it cannot be crystallized and thus purified for further characterization, the above formula, by necessity, is based solely on analytical data. This product is described and claimed in Dyer application, Serial No. 860,191, filed December 7, 1959, now U.S. Patent 2,995,421. Other specific compounds useful in the present invention may be represented by the formulas: $NaAl_4H_{17}(PO_4)_{10} \cdot 5H_2O$, $NaAl_3H_{14}(PO_4)_8 \cdot 6H_2O$ and $NaAl_3H_{17}(PO_4)_9 \cdot 6H_2O$. The term sodium aluminum phosphate used herein is intended to include all of the above described compositions.

A typical yeast roll formulation containing my chemical leavening is shown in the following table.

TABLE I

| | Parts by weight |
|---|---|
| Hard winter wheat flour | 100.00 |
| Salt | 2.12 |
| Baker's special sugar | 9.50 |
| Non-fat dry skim milk | 4.77 |
| Bread improver (Arkady) | 0.54 |
| Dried yeast | 4.34 |
| Hydrogenated vegetable shortening | 9.55 |
| Amylase (crushed) | 0.09 |
| Free-flowing bicarbonate of soda | 2.16 |
| SAP [$NaAl_3H_{14}(PO_4)_8 \cdot 4H_2O$] | 3.60 |

To achieve a desired leavening action by the present invention, from about 0.5 to 4.0 parts of bicarbonate of soda are required for each 100 parts of flour. A preferred range is from about 1.5 to 2.5 parts bicarbonate for each 100 parts of flour. The quantity of SAP required will depend upon three factors, viz., the amount of bicarbonate used, the neutralizing strength (N.S.) of the acid, and the desired acidity of the resulting rolls. Neutralizing strength is measured as the parts by weight of bicarbonate of soda which will be neutralized by exactly 100 parts by weight of the acid-reacting substance. Normally, the various SAP modifications have a neutralizing strength of from 100 to 115, depending upon the number of acidic hydrogen atoms present in the SAP molecule. The tetrahydrate SAP shown in the formulation above has a N.S. of about 100, requiring only 2.16 parts SAP to neutralize the bicarbonate present. It can be seen, however, that a considerable excess of SAP was used in the formulation of Table I. Although not strictly necessary, excess acid has been found to impart desirable leavening and taste characteristics by decreasing the pH of the dough. The preferred range of SAP is found to be at least 100% and up to about 250% of that theoretically required to exactly neutralize that quantity of bicarbonate of soda added to the dough.

The standard yeast dough formulations which may be used by my method are those currently in commercial use or containing equivalent substituents for the usual ingredients shown in Table I, above. These formulations are in accordance with those described in the Federal Definitions for Bakery Products, 1952, under the heading for yeast-leavened baking products. For specific examples and a discussion of the permissible ingredients, see for example, Bakery Technology and Engineering, S. A. Matz (Avi. 1960), p. 250, et seq.

Where mentioned herein, a standard yeast dough formulation for rolls comprises the major ingredients, i.e., flour, sugar, and shortening, set forth in Table I, or equivalents, therefore, in about the proportions shown. A typical example of the freedom of substitution of equivalent ingredients can be demonstrated with the shortening. In this regard, it can be found that a highly emulsified type of shortening such as the so-called lactylated or GLP shortenings, produce the best results. These shortenings are manufactured by combining with the usual mono- or diglyceride, one or more molecules of lactic acid. Nevertheless, the various well-known shortenings such as hydrogenated vegetable shortening may be used, especially if a small amount of propylene glycol emulsifying agent is added. See for example, Cereals as Food and Feed, S. A. Matz (Avi. 1959), p. 346, et seq.

The specific examples given below show results accomplished using about the same procedural technique employed in commercial bakeries to manufacture yeast doughs. The yeast dough formulations in every instance corresponds, as to ingredients and proportions, except for the chemical leavening system, with the formulation shown in Table I, supra. The weight of the ingredients used in grams was equivalent numerically to the parts by weight of Table I.

The following standard procedure was used. The amylase was dissolved in 10 ml. of tap water. The yeast was allowed to stand 12 minutes in 150 ml. of 105° F. water, whereafter it was added together with the amylase solution to a chilled mixing bowl containing 340 grams of crushed ice and 250 ml. of ice water. The flour, sugar, salt, dry skim milk, and bread improver were then added to the bowl. After mixing the ingredients of the bowl in an electric mixer for about one minute at slow speed the shortening was added by spreading it over the mix. Five minutes additional mixing was accomplished at medium speed. The dough was then placed in a 40° F. cooler for one hour. The aged dough was broken into several pieces and the bicarbonate of soda and SAP added. Once again the dough was mixed; 30 seconds at slow speed and 4.5 minutes at medium speed. In the finishing step of preparation the dough was rolled, folded once, rolled and cut and then frozen quickly. Proofing and baking characteristics were determined after allowing frozen doughs to remain in storage for specific periods ranging from about two to ten weeks.

The proofing procedure involved placing the dough (still frozen) on baking sheets and thereafter allowing it to stand either (1) at room temperature or (2) in an electrically heated wall oven preheated to 150° F. Various proofing times were tried. Immediately after proofing, the dough was placed in an oven at 400° F. for baking. The rolls were retained in the oven for 10 minutes or until evenly golden brown.

The following examples, conducted under the foregoing procedure, furnish the pertinent data and results of controlled experiments. To produce comparative results, all of the doughs used contained identical formulations (with the single exception of chemical leavening agents) and the same quantities of baker's yeast. The criterion used for comparison between yeast-leavened and chemically leavened doughs was the specific volume of the rolls after baking. See for example, Phosphoric Acid, Phosphates and Phosphatic Fertilizers, W. H. Waggaman, Reinhold Corp, 2nd edition, 1952, pp. 450–455. Examples are also directed to demonstrating the different results obtainable by varying proofing procedure.

*Example 1.—Effects of Proofing Procedure*

| Sample | Soda (per 100 gms. flour), gms. | SAP (per 100 gms. flour), gms. | Proofing time, min. | Proofing Temperature | Specific Vol. of Baked Rolls |
|---|---|---|---|---|---|
| Control | 0 | 0 | 30 | 75° F. (room) | 2.27 |
| Test | 1.62 | 2.7 | 30 | do | 2.96 |
| Control | 0 | 0 | 60 | do | 2.51 |
| Test | 1.62 | 2.7 | 60 | do | 3.94 |
| Control | 0 | 0 | 15 | 150° F. (oven) | 2.61 |
| Test | 1.62 | 2.7 | 15 | do | 3.26 |
| Control | 0 | 0 | 20 | do | 2.58 |
| Test | 1.62 | 2.7 | 20 | do | 3.47 |
| Control | 0 | 0 | 30 | do | 2.59 |
| Test | 1.62 | 2.7 | 30 | do | 3.28 |

From the above example it can be seen that a distinct improvement in short-term leavening action can be obtained from a fairly small amount of chemical leavening ingredients. It can also be observed that maximum leavening is produced at shorter proofing times under elevated temperatures. In all of the above test samples the resulting chemically leavened rolls were of acceptable specific volume, while those proofed at room temperature for 60 minutes and at 150° F. for 15 minutes were particularly satisfactory. None of the yeast-leavened rolls produced could be considered acceptable.

*Example 2.—Effects of Chemical Leavening Proportions*

| Sample | Soda (per 100 gms. flour), gms. | SAP (per 100 gms. flour), gms. | Proofing time, min. | Proofing Temperature | Specific Vol. of Baked Rolls |
|---|---|---|---|---|---|
| I | 1.62 | 2.7 | 30 | 75° F. (room) | 2.96 |
| II | 1.62 | 2.7 | 20 | 150° F. (oven) | 3.47 |
| III | 2.16 | 3.6 | 30 | 75° F. (room) | 3.80 |
| IV | 2.16 | 3.6 | 20 | 150° F. (oven) | 3.85 |
| V | 2.70 | 4.5 | 20 | do | 3.87 |
| VI | 3.24 | 5.4 | 30 | 75° F. (room) | 3.74 |

*Example 3.—Comparative Ultimate Leavening Action*

| Sample | Soda (per 100 gms. flour), gms. | SAP (per 100 gms. flour), gms. | Proofing time, min. | Proofing Temperature | Specific Vol. of Baked Rolls |
|---|---|---|---|---|---|
| Control | 0 | 0 | 120 | 75° F. (room) | 3.48 |
| Test I | 2.16 | 3.6 | 30 | do | 3.80 |
| Test II | 3.24 | 5.4 | 30 | do | 3.71 |
| Control | 0 | 0 | 120 | do | 3.48 |
| Test I | 2.16 | 3.6 | 20 | 150° F. (oven) | 3.87 |
| Test II | 2.70 | 4.5 | 20 | do | 3.87 |

Example 2 above shows the effect of varying the level of chemical additives. Samples I, III, and VI, proofed at identical conditions of temperature and time, demonstrate the fact that, as the additive level is increased, the specific volume of the rolls improves to a maximum, whereafter increasing the additive level produces no further improvement, in fact, may even result in a decrease in effectiveness. A similar comparison can be made from samples II, IV, and V. Although all of the rolls of Example 2 were found acceptable, those containing 2.16 and 2.7 grams of bicarbonate of soda were clearly preferable.

The data of Example 3 represent two similar test groups employing three samples each. It will be noted that the control samples in each case produced the same specific volume rolls. From each experiment it is evident that the proofing time for chemically leavened yeast rolls is considerably less than those leavened exclusively with yeast—about two hours was required for yeast-leavened rolls while only 20 to 30 minutes proofing time was sufficient for chemically leavened rolls.

The final baked products of Examples 1-3 were tested for taste and general physical characteristics, and no distinctions were found between those prepared with chemical leavening and those without it.

In general, it was found that the SAP and bicarbonate of soda should be added when the dough is punched. Also, thorough mixing of the chemical leavening ingredients in the dough is required to eliminate striations due to local concentrations of leavening. The dough to which the chemical leavening ingredients are added may be at room temperature or, preferably, chilled to prevent any bench action with an attendant loss of leavening potential.

Because chemically leavened yeast doughs are more quickly proofed they are more susceptible to overproofing. If the doughs are proofed too long, shrinkage and drying will occur. I have found that about 30 minutes at room temperature or 20 minutes at an oven temperature of 150° F. are suitable proofing times where the doughs contain from 1.5 to 4.0 parts of bicarbonate of soda for each 100 parts flour. Because shrinkage occurs more rapidly at higher temperatures, oven proofing should be more carefully controlled.

While an excess of baking acid, viz., 100% up to 250% of that theoretically required to exactly neutralize the soda, is preferred, it should be noted that due to its negligible effect on taste, excess SAP can be added in any proportion which does not adversely affect the pH of the resulting rolls. The excess acid, which does not react or increase the total leavening action but may improve the speed of leavening, contributes significantly to the acidity of the product.

Because of the negligible effect on taste and controllable bench action when included in a yeast dough, the chemical leavening ingredients of the present invention may also be used with unfrozen yeast doughs. In the preparation of pre-baked yeast rolls, for instance, the chemical leavening ingredients can be used by the baker to reduce proofing time and materially improve baking procedure. The yeast doughs of the present invention are particularly well-suited to automated commercial baking techniques which require rapid, controllable leavening action.

The foregoing detailed description has been given for clearness of understanding only, and no unnecessary limitations should be understood therefrom, as modifications will be obvious to those skilled in the art.

What I claim is:

1. An improved yeast dough formulation consisting of a standard yeast dough formulation containing from 0.5 to 4.0 parts by weight bicarbonate of soda for each 100 parts by weight flour in said standard yeast dough formulation, and from 100% to 250% of the theoretical amount of a sodium aluminum phosphate baking acid necessary to completely neutralize said bicarbonate of soda.

2. A frozen yeast dough formulation consisting of a standard yeast dough formulation containing from 0.5 to 4.0 parts by weight bicarbonate of soda for each 100 parts by weight flour in said standard yeast dough formulation, and from 1.0 to 2.5 parts by weight of a sodium aluminum phosphate of the formula $$NaAl_3H_{14}(PO_4)_8 \cdot 4H_2O$$

for each part by weight of said bicarbonate of soda.

References Cited in the file of this patent
UNITED STATES PATENTS 2,969,289    Matz _____ Jan. 24, 1961
2,995,421    Dyer _____ Aug. 8, 1961

OTHER REFERENCES

"Cereal Science Today," April 1959, pp. 91, 92.
"Feed Research," July-August 1951, p. 353.